United States Patent
Cantwell et al.

(10) Patent No.: US 9,452,814 B2
(45) Date of Patent: Sep. 27, 2016

(54) AUTONOMOUS POWER GENERATION IN SUBMERSIBLE ENVIRONMENTS

(71) Applicant: The Boeing Company, Chicago, IL (US)

(72) Inventors: Jeffrey Richard Cantwell, Chino Hills, CA (US); James D. Conniff, Yorba Linda, CA (US)

(73) Assignee: The Boeing Company, Chicago, IL (US)

( * ) Notice: Subject to any disclaimer, the term of this patent is extended or adjusted under 35 U.S.C. 154(b) by 98 days.

(21) Appl. No.: 14/202,347

(22) Filed: Mar. 10, 2014

(65) Prior Publication Data

US 2015/0251741 A1   Sep. 10, 2015

(51) Int. Cl.
| | |
|---|---|
| *B63H 21/17* | (2006.01) |
| *B63H 21/14* | (2006.01) |
| *G05D 1/02* | (2006.01) |
| *B63G 8/12* | (2006.01) |
| *B63G 8/36* | (2006.01) |
| *B63G 8/00* | (2006.01) |

(52) U.S. Cl.
CPC ............... *B63H 21/17* (2013.01); *B63G 8/12* (2013.01); *B63G 8/36* (2013.01); *B63H 21/14* (2013.01); *G05D 1/0206* (2013.01); *B63G 2008/004* (2013.01); *Y02T 70/5218* (2013.01)

(58) Field of Classification Search
CPC .. G05D 1/0206; B65H 21/213; B65H 21/22; B65H 25/42; B63B 49/00
USPC ..................................................... 701/21, 22
See application file for complete search history.

(56) References Cited

U.S. PATENT DOCUMENTS

| | | | | |
|---|---|---|---|---|
| 2,720,856 | A | | 10/1955 | Hoke |
| 4,346,662 | A | * | 8/1982 | Rogers ................. F42B 19/125 114/20.1 |
| 4,609,362 | A | * | 9/1986 | DeMarco ............... F42B 19/24 114/20.2 |
| 4,637,213 | A | * | 1/1987 | Lobell .................... F42B 19/16 114/20.2 |
| 4,698,974 | A | * | 10/1987 | Wood ....................... C01B 3/08 60/649 |

(Continued)

FOREIGN PATENT DOCUMENTS

| | | |
|---|---|---|
| GB | 106330 A | 5/1917 |
| WO | 2009008880 A1 | 1/2009 |

*Primary Examiner* — Jerrah Edwards
*Assistant Examiner* — Majdi Alsomiri
(74) *Attorney, Agent, or Firm* — Duft Bornsen & Fettig LLP

(57) ABSTRACT

Embodiments provide for safely and reliably operating a generator in a submersible environment utilizing an autonomous control system. One embodiment is a power generation system that includes a generator, a water-tight enclosure surrounding the generator, an intake valve, an exhaust valve, and a controller. The intake valve couples an air intake on the generator to an outside surface of the enclosure. The exhaust valve couples an exhaust port on the generator to the outside surface. If the controller determines that the enclosure will submerge, then the controller stops the generator and closes the intake valve and the exhaust valve. After detecting that the enclosure has surfaced, the controller opens the intake valve, opens the exhaust valve, and starts the generator.

17 Claims, 4 Drawing Sheets

(56) References Cited

U.S. PATENT DOCUMENTS

| | | | | |
|---|---|---|---|---|
| 4,734,070 | A * | 3/1988 | Mondek | F02B 61/045 123/195 P |
| 4,819,576 | A * | 4/1989 | Shaw | B63B 35/665 114/248 |
| 4,831,297 | A * | 5/1989 | Taylor | B63H 23/24 310/87 |
| 4,971,586 | A * | 11/1990 | Walsh | F02B 61/00 114/55.56 |
| 5,117,635 | A * | 6/1992 | Blau | F10K 15/04 114/20.2 |
| 5,252,875 | A * | 10/1993 | Veronesi | B63H 1/16 310/114 |
| 5,503,100 | A * | 4/1996 | Shaw | B63B 1/24 114/271 |
| 5,573,436 | A * | 11/1996 | Trudeau | F02M 35/10013 440/77 |
| 5,577,456 | A * | 11/1996 | Kobayashi | B63G 8/36 114/242 |
| 5,595,515 | A * | 1/1997 | Hasegawa | B63H 20/245 440/89 G |
| 5,598,700 | A * | 2/1997 | Varshay | B63B 1/246 440/44 |
| 5,632,659 | A * | 5/1997 | Martin | F01P 11/0276 123/198 D |
| 5,990,809 | A * | 11/1999 | Howard | B63H 19/08 324/323 |
| 6,152,102 | A * | 11/2000 | Ruman | F02B 17/00 123/295 |
| 6,367,450 | B1 * | 4/2002 | Kato | F02B 61/045 123/406.26 |
| 6,427,618 | B1 * | 8/2002 | Hilleman | B63G 8/08 114/20.2 |
| 6,520,167 | B1 * | 2/2003 | Kanno | F02B 61/045 123/480 |
| 6,591,776 | B2 * | 7/2003 | Miyazaki | B63B 1/107 114/274 |
| 6,612,272 | B2 * | 9/2003 | Kato | F01P 3/16 123/41.82 R |
| 6,725,797 | B2 * | 4/2004 | Hilleman | B63G 13/02 114/151 |
| 6,779,345 | B2 * | 8/2004 | Girouard | F42B 19/125 60/646 |
| 6,978,617 | B2 * | 12/2005 | Goldmeer | F01K 25/005 429/418 |
| 7,077,072 | B2 * | 7/2006 | Wingett | B63B 22/18 114/312 |
| 7,290,496 | B2 * | 11/2007 | Asfar | B63G 8/001 114/312 |
| 7,353,768 | B1 * | 4/2008 | Jones | B63G 8/001 114/312 |
| 7,789,723 | B2 * | 9/2010 | Dane | B63B 35/00 114/312 |
| 7,938,077 | B1 * | 5/2011 | Dunn | B63G 8/08 114/20.2 |
| 8,137,834 | B2 * | 3/2012 | Vivien | F42B 19/26 429/119 |
| 8,265,809 | B2 * | 9/2012 | Webb | G01C 13/002 114/337 |
| 9,096,106 | B2 * | 8/2015 | Hanson | B60F 5/00 |
| 2002/0152947 | A1 | 10/2002 | Hilleman | B63G 8/08 114/338 |
| 2003/0143902 | A1 * | 7/2003 | McChesney | F02B 1/045 440/88 N |
| 2003/0167998 | A1 * | 9/2003 | Huntsman | B63G 8/08 114/312 |
| 2004/0200399 | A1 * | 10/2004 | Abdel-Maksoud | B63G 8/12 114/337 |
| 2006/0075949 | A1 * | 4/2006 | Root, Jr. | B63B 1/107 114/61.15 |
| 2006/0075987 | A1 * | 4/2006 | Digregorio | B63H 21/14 123/198 E |
| 2008/0132130 | A1 * | 6/2008 | Nigel | B63B 22/18 441/22 |
| 2009/0320442 | A1 * | 12/2009 | Butler | B63H 11/14 60/204 |
| 2010/0258449 | A1 * | 10/2010 | Fielder | C02F 1/04 205/628 |
| 2012/0097086 | A1 * | 4/2012 | Sancoff | B63B 1/107 114/15 |
| 2012/0289103 | A1 * | 11/2012 | Hudson | F42B 19/00 440/38 |
| 2013/0307274 | A1 * | 11/2013 | Sia | F03D 9/002 290/55 |
| 2014/0113210 | A1 * | 4/2014 | Gerlier | F04D 29/445 429/451 |
| 2014/0193688 | A1 * | 7/2014 | Senez | F42B 19/00 429/119 |
| 2015/0167531 | A1 * | 6/2015 | Mehring | F01M 5/001 123/41.44 |
| 2015/0263354 | A1 * | 9/2015 | Mazzeschi | B63B 21/17 429/119 |

* cited by examiner

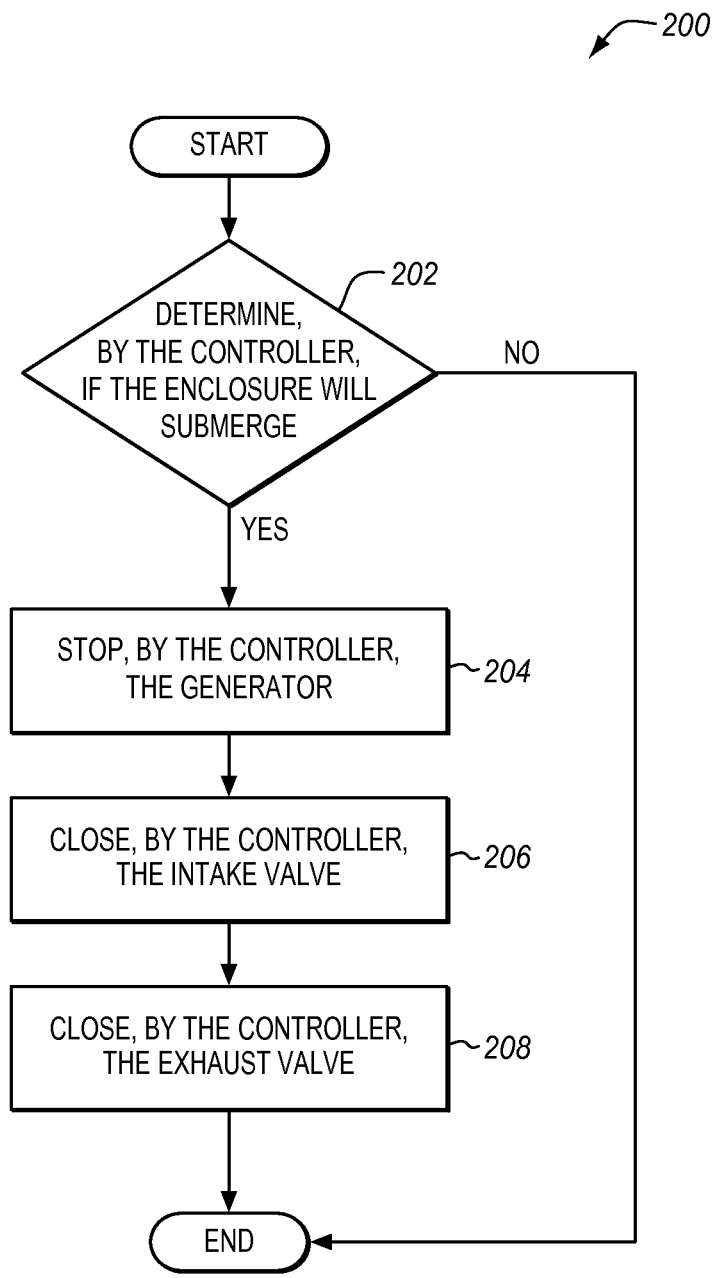

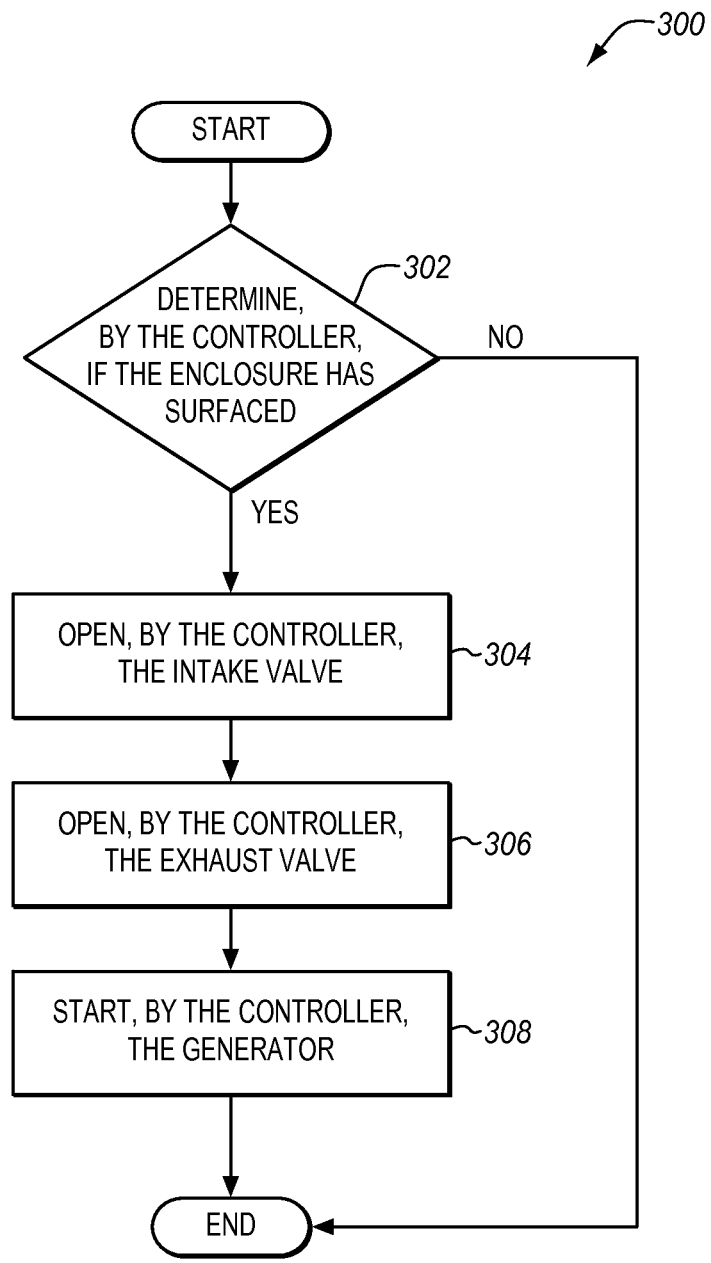

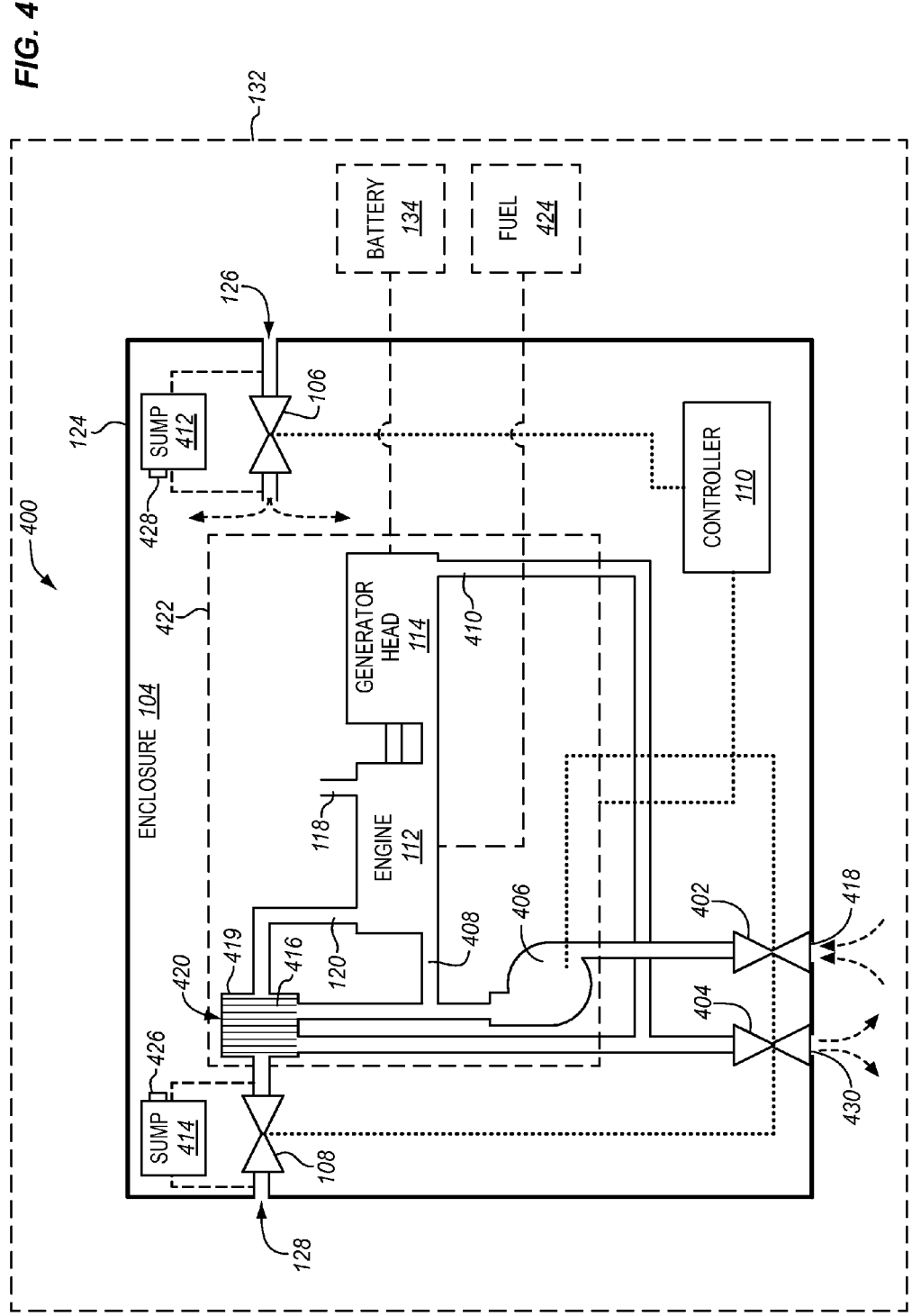

AUTONOMOUS POWER GENERATION IN SUBMERSIBLE ENVIRONMENTS

FIELD

This disclosure relates to the field of power generation and in particular, to generators that operate in submersible environments.

BACKGROUND

Autonomous Underwater Vehicles (AUV) may operate independently of a human operator and typically include batteries to provide power to the vehicle. Batteries offer a high energy density in a small package, yet are limited by the total amount of energy that they may store. Thus, battery storage capacity may become a limiting factor in how long an AUV may operate.

While generators (e.g., diesel fuel generators) may provide electrical power for charging batteries by burning fuel, combustion requires the intake of oxygen (e.g., in air) and a means to discharge combustion gasses. Further, water-based environments, and especially submersible environments encountered by an AUV, may quickly damage a generator through the unintended introduction of water into the generator's intake and exhaust ports.

It thus remains a problem to ensure the autonomous operation of generators in a submersible environment.

SUMMARY

Embodiments described herein provide for safely and reliably operating a generator in a submersible environment utilizing an autonomous control system. For example, an AUV may include a self-contained power system that automatically starts/stops a generator when the AUV surfaces/submerges. When the AUV surfaces, the power system may open valves, start a generator, and provide power to charge batteries in the AUV. This may prolong the amount of time the AUV may operate. Prior to the AUV submerging, the power system may stop the generator, close valves, and prepare to submerge.

One embodiment is an apparatus including a generator, a water-tight enclosure surrounding the generator, an intake valve, an exhaust valve, and a controller. The generator includes a combustion air intake port and a combustion exhaust port. The intake valve couples the air intake port to an outside surface of the enclosure, and is configured to transport air from the outside surface of the enclosure to the air intake port when the intake valve is open. The exhaust valve couples the exhaust port to the outside surface of the enclosure, and is configured to transport exhaust from the exhaust port to the outside surface of the enclosure when the exhaust valve is open. The controller is configured to determine that the enclosure will submerge, and responsive to the determination, is configured to stop the generator, to close the intake valve, and to close the exhaust valve. The controller is configured to detect that the enclosure has surfaced, and responsive to the detection, is further configured to open the intake valve, to open the exhaust valve, and to start the generator.

Another embodiment is an apparatus including an Autonomous Underwater vehicle that includes a rechargeable battery and a water-tight enclosure within the AUV. The apparatus further includes a generator within the enclosure, an intake valve, an exhaust valve, and a controller. The generator includes a combustion air intake port and a combustion exhaust port. The intake valve couples the air intake port to an outside surface of the enclosure, and is configured to transport air from the outside surface of the enclosure to the air intake port when the intake valve is open. The exhaust valve couples the exhaust port to the outside surface of the enclosure, and is configured to transport exhaust from the exhaust port to the outside surface of the enclosure when the exhaust valve is open. The controller is configured to determine that the AUV will submerge, and responsive to the determination, is configured to stop the generator, to close the intake valve, and to close the exhaust valve. The controller is configured to detect that the AUV has surfaced, and responsive to the detection, is configured to open the intake valve, to open the exhaust valve, to start the generator, and to the charge the battery.

Another embodiment is a method of operating an autonomous power generation system in a submersible environment. The method comprises determining, by a controller communicatively coupled to a generator within a water-tight enclosure, if the enclosure will submerge, where the generator includes a combustion air intake port and a combustion exhaust port. The method further comprises stopping, by the controller, the generator responsive to determining that the enclosure will submerge. The method further comprises closing, by the controller responsive to stopping the generator, an intake valve coupling the air intake port to an outside surface of the enclosure, where the intake valve is configured to transport air from the outside surface of the enclosure to the air intake port when the intake valve is open. The method further comprises closing, by the controller responsive to stopping the generator, an exhaust valve coupling the exhaust port to the outside surface of the enclosure, where the exhaust valve is configured to transport exhaust from the exhaust port to the outside surface of the enclosure when the exhaust valve is open.

The features, functions, and advantages that have been discussed may be achieved independently in various embodiments or may be combined in yet other embodiments further details of which may be seen with reference to the following description and drawings.

DESCRIPTION OF THE DRAWINGS

Some embodiments are now described, by way of example only, and with reference to the accompanying drawings. The same reference number represents the same element or the same type of element on all drawings

FIG. 2 is a flow chart of a method of operating the power generation system of FIG. 1 in an exemplary embodiment.

FIG. 3 is another flowchart of a method of operating the power generation system of FIG. 1 in an exemplary embodiment.

FIG. 4 is an illustration of an autonomous power generation system in another exemplary embodiment.

DESCRIPTION

Figure 1:
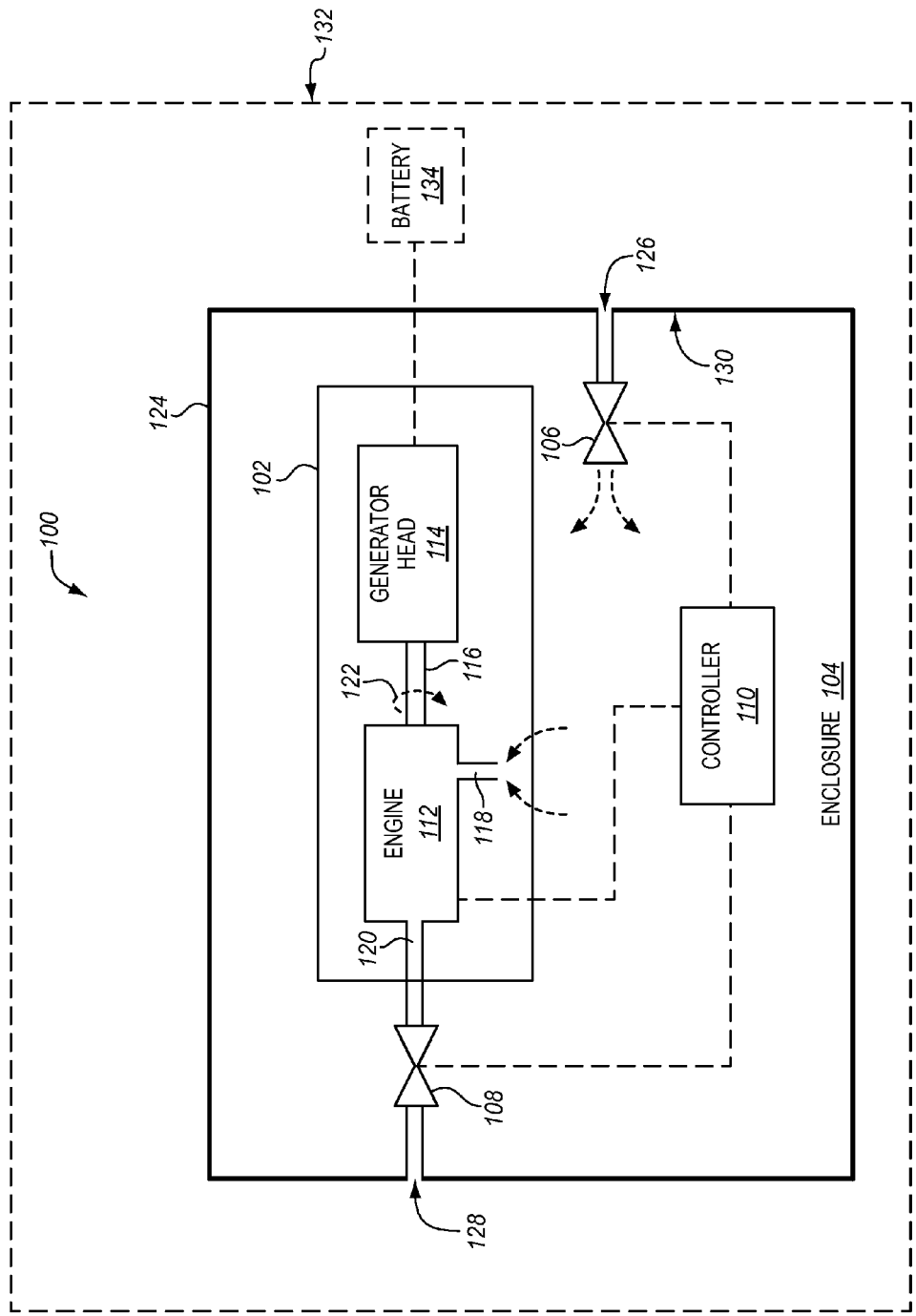
FIG. 1 is an illustration of an autonomous power generation system in an exemplary embodiment.

The figures and the following description illustrate specific exemplary embodiments. It will thus be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure, and are to be construed as being without limitation. As a result, this disclosure is not limited to the specific embodiments or examples described below, but by the claims and their equivalents.

FIG. 1 is an illustration of an autonomous power generation system 100 in an exemplary embodiment. In some embodiments, system 100 may be included in an AUV 132 to provide electrical power when AUV 132 is on the surface of water. When included in AUV 132, system 100 may operate independent from AUV 132, ensuring that system 100 may self-reconfigure for underwater operation and be submerged in water without damaging the various power generation equipment included within system 100. Once AUV 132 surfaces, system 100 may then self-reconfigure for surface operation and begin generating electrical power for AUV 132. For instance, by charging batteries 134 of AUV 132.

In this embodiment, system 100 includes a generator 102, a water-tight enclosure 104, an intake valve 106, an exhaust valve 108, and a controller 110. Controller 110 directs various elements in FIG. 1 to ensure that generator 102 may operate in a submersible environment without damage. Controller 110 may include a processor (e.g., Cortex-A9, Intel Atom, etc.), not shown, that executes firmware instructions stored in memory (e.g., Random Access Memory, Flash, Static RAM, etc.), also not shown, in order to provide the functionality described herein for controller 110. Further, the use of the term "controller" may be used interchangeably herein with "control system", inasmuch as each refers to an electronic and/or electromechanical device that operates independently of a human operator.

Generator 102 includes an engine 112 mechanically coupled with a generator head 114 via a shaft 116. Engine 112 includes an air intake port 118 and a combustion exhaust port 120. Air intake port 118 supplies air to engine 112 for burning fuel. In a complimentary manner, combustion exhaust port 120 supplies an outlet from engine 112 for hot exhaust gases generated when burning fuel. Engine 112 is capable of burning the fuel (e.g., diesel, natural gas, gasoline, etc.), in order to generate torque to rotate shaft 116 in the direction indicated by arrow 122. When rotating, generator head 114 is capable of providing electrical power to various loads, not shown. One example of an electrical load includes charging batteries 134.

Referring again to FIG. 1, intake valve 106 couples air intake port 118 of engine 112 to an outside surface 124 of enclosure 104. In this embodiment, outside surface 124 of enclosure 104 contacts water. When fully submerged, the entirety of outside surface 124 is in contact with water. However, when surfaced, only a portion of outside surface 124 contacts water. The water, not shown in FIG. 1, may be below a vent 126 of intake valve 106 when enclosure 104 is on the surface of the water. Vent 126 is a passage from outside surface 124 of enclosure 104 to intake valve 106. When open, intake valve 106 transports air from outside surface 124 of enclosure 104 to the inside of enclosure 104 (when enclosure 104 is on the surface of the water). In this embodiment, intake valve 106 vents air (illustrated as arrows proximate to intake valve 106) into enclosure 104. The air may then be drawn into engine 112 via air intake port 118 (illustrated as arrows proximate to air intake port 118) and utilized during combustion. In this embodiment, intake valve 106 is not directly coupled to air intake port 118. This allows incoming air to provide cooling to controller 110, to engine 112, and to generator head 114. However, in some embodiments, intake valve 106 may be directly coupled to air intake port 118 as a matter of design choice.

Exhaust valve 108 couples combustion exhaust port 120 of engine 112 to outside surface 124 of enclosure. When open, combustion exhaust port 120 transports exhaust from engine 112 to outside surface 124 of enclosure 104. In like manner to that described above for intake valve 106, the water may also be below a vent 128 of exhaust valve 108 when enclosure 104 has surfaced. Vent 128 is a passage from outside surface 124 of enclosure to exhaust valve 108. In some embodiments, an exhaust cooler (not shown in FIG. 1) may be utilized to reduce the temperature of the hot exhaust gasses generated by engine 112 prior to venting the exhaust gasses through exhaust valve 108 to outside surface 124. This embodiment will be discussed in more detail later. Although only a single exhaust valve 108 and intake valve 106 are illustrated in FIG. 1, other embodiments may include multiple valves in series to ensure that a single valve failure (e.g., a leak) does not impact the operation of system 100.

FIG. 2 is a flow chart of a method for operating power generation system 100 of FIG. 1 in an exemplary embodiment. Prior to enclosure 104 being submerged in water, controller 110 performs a number of activities to ensure that generator 102 will not be damaged in the process. One problem in water environments is that the introduction of water into generator 102 is damaging. For example, if water enters air intake port 118, the water may hydro-lock engine 112, which could result in permanent damage to engine 112. In like manner, if water enters combustion exhaust port 120, the water may also hydro-lock engine 112, causing potential damage. At the very least, even small amounts of water introduced into generator 102 either from the air intake port 118 or the combustion exhaust port 120 could significantly reduce the operating life of generator 102. During operation, controller 110 determines whether or not enclosure 104 will submerge (see step 202 of FIG. 2). Controller 110 may do so in a number of different ways. For instance, if enclosure 104 is located within AUV 132, then controller may monitor various sensors in AUV 132 to determine if AUV 132 is about to submerge. AUV 132 may change attitude, may add ballast, etc. AUV 132 may send a signal to controller 110 indicating that AUV 132 intends to submerge. In other embodiments, controller 110 may be directing AUV 132 to submerge and therefore, controller 110 may perform the steps of FIG. 2 prior to submerging AUV 132. If controller 110 determines that enclosure 104 will submerge, then step 204 is performed. Otherwise method 200 ends. Prior to enclosure 104 submerging, controller 110 stops generator 102 (see step 204 of FIG. 2). To do so, controller 110 may transmit a command to engine 112, may shut off a fuel supply to engine 112, etc. When submerged, both vents 126 and 128 are below the surface of the water. Thus, controller 110 will close intake valve 106 (see step 206 of FIG. 2) and close exhaust valve 108 (see step 208 of FIG. 2) prior to submersion.

At some point in time, enclosure 104 may be brought back to the surface of the water. For example, if system 100 is part of AUV 132, then AUV 132 may surface to allow system 100 to recharge batteries 134 on AUV 132. FIG. 3 is another flowchart of a method for operating the power generation system of FIG. 1 in an exemplary embodiment. During operation, controller 110 determines whether or not enclosure 104 has surfaced (see step 302 of FIG. 2). Controller 110 may do so in a number of different ways. For instance, if enclosure 104 is located within AUV 132, then controller may monitor various sensors in AUV 132 to determine if AUV 132 has surfaced. AUV 132 may change attitude, may remove ballast, etc. AUV 132 may send a signal to controller 110 indicating that AUV 132 has surfaced. In other embodiments, controller 110 may be directing AUV 132 to surface and therefore, controller 110 may perform the steps of FIG. 3 after surfacing AUV 132. If controller 110 determines that enclosure 104 has surfaced, then step 304 is performed. Otherwise method 300 ends. In response to enclosure 104 surfacing, both vents 126 and 128 are above the surface of the water. In response to surfacing, controller 110 performs a number of actions to prepare generator 102 for operation. In particular, controller 110 opens intake valve 106 (see step 304 of FIG. 3), and opens exhaust valve 108 (see step 306 of FIG. 3). Controller 110 then is able to start generator 102 (see step 308 of FIG. 3), which allows generator 102 to begin generating electricity. To do so, controller 110 may turn on a fuel supply (not shown) to engine 112, and transmit a command to generator 102 to start engine 112.

FIG. 4 is an illustration of an autonomous power generation system 400 in another exemplary embodiment. In this embodiment, system 400 includes a coolant inlet valve 402 and a coolant outlet valve 404. A vent 418 allows water (illustrated as arrows in FIG. 4) to pass from outside surface 124 to coolant inlet valve 402, and vent 430 allows water (illustrated as arrows in FIG. 4) to pass from coolant outlet valve 404 to outside surface 124. Water is then transported to a coolant inlet 408 of generator 422 via a pump 406 of generator. Coolant pump 406 drives water through a heat exchanger 420 of generator 422, engine 112, and generator head 114, which exits at a coolant outlet port 410 of generator 422. The water is then ejected from enclosure 104 via coolant outlet valve 404. When enclosure 104 is on the surface, controller 110, prior to starting generator 102, may open both coolant inlet valve 402 and coolant outlet valve 404, and turn on a supply of fuel 424 for generator 422. Pump 406 may then start to circulate water through generator 422. In like manner, controller 110, prior to enclosure being submerged, may stop generator 422, which stops coolant pump 406. Controller 110 may then close coolant inlet valve 402, close coolant outlet valve 404, and turn off a supply of fuel 424 for generator. This allows system 400 to safely be submerged.

Heat exchanger 420 is used by generator 422 to cool exhaust gasses generated during operation of generator 422. Exhaust gases, especially for diesel generators, may reach high temperatures. The high temperatures may then damage exhaust tubing and exhaust valve 108. Heat exchanger 420 includes a plurality of water-tight tubes 416 surrounded by a water-tight shell 419. Tubes 416 carry water (provided by coolant pump 406), while shell 419 carries exhaust gasses generated by engine 112. Heat is transferred from the hot exhaust gasses to the water, which is then re-directed to coolant outlet valve 404 and ejected from enclosure 104.

Also illustrated in FIG. 4 are an intake sump 412 and an exhaust sump 414. Intake sump 412 includes a water level sensor 428, and exhaust sump 414 includes a water level sensor 426. Intake sump 412 and exhaust sump 414 are used in this embodiment to capture any water that may remain in tubing between various valves after surfacing. For example, intake sump 412 may be located between intake valve 106 and outside surface 124 of enclosure. After surfacing, controller 110 may direct a pump (not shown) to remove any water that collected in sump 412. Removing water from intake sump 412 may be performed if controller 110 detects that the water level in intake sump 412 is above a threshold by reading sensor 428. This ensures that water does not remain in any piping that may be accidently drawn into generator 422 during operation. The dashed lines proximate to intake sump 412 illustrates that intake sump 412 may be located on either side of intake valve 106. In some embodiments, intake sump 412 may be located on the interior side of intake valve 106 to capture any water that may leak past intake valve 106 when enclosure 104 is submerged.

In like manner, exhaust sump 414 may be located between exhaust valve 108 and outside surface 124 of enclosure, or on the interior side of exhaust valve 108, as indicated by the dashed lines proximate to exhaust sump 414. After surfacing, controller 110 may direct a pump (not shown) to remove any water that collected in exhaust sump 414. Removing water from exhaust sump 414 may be performed if controller 110 detects that the water level in exhaust sump 414 is above a threshold by reading sensor 426. This ensures that water does not remain in any piping that may be accidently drawn into generator 422 during operation.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope is not limited to those specific embodiments. Rather, the scope is defined by the following claims and any equivalents thereof.

The invention claimed is:

1. An Autonomous Underwater Vehicle (AUV) comprising:
 a generator including a combustion air intake port and a combustion exhaust port, a coolant inlet port, and a coolant outlet port;
 a water-tight enclosure surrounding the generator;
 an intake valve coupling the air intake port to an outside surface of the enclosure, wherein the intake valve is configured to transport air from the outside surface of the enclosure to the air intake port when the intake valve is open;
 an exhaust valve coupling the exhaust port to the outside surface of the enclosure, wherein the exhaust valve is configured to transport exhaust from the exhaust port to the outside surface of the enclosure when the exhaust valve is open;

a coolant inlet valve coupling the coolant inlet port of the generator to the outside surface of the enclosure, wherein the coolant inlet valve is configured to transport water from the outside surface of the enclosure to the coolant inlet port when the coolant inlet valve is open; and a coolant outlet valve coupling the coolant outlet port of the generator to the outside surface of the enclosure, wherein the coolant outlet valve is configured to transport water from the coolant outlet port to the outside surface of the enclosure when the coolant outlet valve is open; and a controller configured to determine that the enclosure will submerge, and responsive to the determination, is configured to stop the generator, to close the intake valve, to close the exhaust valve, to close the coolant inlet valve, and to close the coolant outlet valve;

the controller is configured to detect that the enclosure has surfaced, and responsive to the detection, is configured to open the intake valve, to open the exhaust valve, to open the coolant inlet valve, to open the coolant outlet valve, and to start the generator.

2. The AUV of claim 1 wherein:
the controller, prior to starting the generator, is configured to turn on a supply of fuel to the generator.

3. The AUV of claim 1 further comprising:
an intake sump disposed between the intake valve and the outside surface of the enclosure; and
a water level sensor coupled with the intake sump;
wherein the controller, prior to starting the generator, is configured to determine a water level in the intake sump utilizing the water level sensor.

4. The AUV of claim 3 wherein:
the controller is configured to start a pump to remove water from the intake sump responsive to determining that the water level is above a threshold.

5. The AUV of claim 1 further comprising:
an exhaust sump disposed between the exhaust valve and the outside surface of the enclosure; and
a water level sensor coupled with the exhaust sump;
wherein the controller, prior to starting the generator, is configured to determine a water level in the exhaust sump utilizing the water level sensor.

6. The AUV of claim 5 wherein:
the controller is configured to start a pump to remove water from the exhaust sump responsive to determining that the water level is above a threshold.

7. The AUV of claim 1 further comprising:
an intake sump disposed between the intake port of the generator and the intake valve; and
a water level sensor coupled with the intake sump;
wherein the controller, prior to starting the generator, is configured to determine a water level in the intake sump utilizing the water level sensor.

8. The AUV of claim 7 wherein:
the controller is configured to start a pump to remove water from the intake sump responsive to determining that the water level is above a threshold.

9. The AUV of claim 1 further comprising:
an exhaust sump disposed between the exhaust port of the generator and the exhaust valve; and
a water level sensor coupled with the exhaust sump;
wherein the controller, prior to starting the generator, is configured to determine a water level in the exhaust sump utilizing the water level sensor.

10. The AUV of claim 9 wherein:
the controller is configured to start a pump to remove water from the exhaust sump responsive to determining that the water level is above a threshold.

11. An apparatus comprising:
an Autonomous Underwater Vehicle (AUV) including a rechargeable battery;
a water-tight enclosure within the AUV;
a generator within the enclosure, wherein the generator includes a combustion air intake port, a combustion exhaust port, a coolant inlet port, and a coolant outlet port;
an intake valve coupling the air intake port to an outside surface of the enclosure, wherein the intake valve is configured to transport air from the outside surface of the enclosure to the air intake port when the intake valve is open;
an exhaust valve coupling the exhaust port to the outside surface of the enclosure, wherein the exhaust valve is configured to transport exhaust from the exhaust port to the outside surface of the enclosure when the exhaust valve is open;
a coolant inlet valve coupling the coolant inlet port of the generator to the outside surface of the enclosure, wherein the coolant inlet valve is configured to transport water from the outside surface of the enclosure to the coolant inlet port when the coolant inlet valve is open;
a coolant outlet valve coupling the coolant outlet port of the generator to the outside surface of the enclosure, wherein the coolant outlet valve is configured to transport water from the coolant outlet port to the outside surface of the enclosure when the coolant outlet valve is open; and
a controller configured to determine that the AUV will submerge, and responsive to the determination, is configured to stop the generator, to close the intake valve, to close the exhaust valve, to close the coolant inlet valve, and to close the coolant outlet valve;
the controller is configured to detect that the AUV has surfaced, and responsive to the detection, is configured to open the intake valve, to open the exhaust valve, to open the coolant inlet valve, to open the coolant outlet valve, to start the generator, and to charge the battery.

12. The apparatus of claim 11 wherein:
the controller, prior to starting the generator, is configured to turn on a supply of fuel to the generator.

13. The apparatus of claim 11 further comprising:
an intake sump disposed between the intake valve and the outside surface of the enclosure; and
a water level sensor coupled with the intake sump;
wherein the controller, prior to starting the generator, is configured to determine a water level in the intake sump utilizing the water level sensor, and to start a pump to remove water from the intake sump responsive to determining that the water level is above a threshold.

14. The apparatus of claim 11 further comprising:
an exhaust sump disposed between the exhaust valve and the outside surface of the enclosure; and
a water level sensor coupled with the exhaust sump;
wherein the controller, prior to starting the generator, is configured to determine a water level in the exhaust sump utilizing the water level sensor, and to start a pump to remove water from the exhaust sump responsive to determining that the water level is above a threshold.

15. The apparatus of claim 11 further comprising:
an intake sump disposed between the intake port of the generator and the intake valve; and
a water level sensor coupled with the intake sump;
wherein the controller, prior to starting the generator, is configured to determine a water level in the intake sump utilizing the water level sensor, and to start a pump to remove water from the intake sump responsive to determining that the water is above a threshold.

16. The apparatus of claim 11 further comprising:
an exhaust sump disposed between the exhaust port of the generator and the exhaust valve; and
a water level sensor coupled with the exhaust sump;
wherein the controller, prior to starting the generator, is configured to determine a water level in the exhaust sump utilizing the water level sensor, and to start a pump to remove water from the exhaust sump responsive to determining that the water level is above a threshold.

17. A method operable by an Autonomous Underwater Vehicle (AUV), the method comprising:
determining, by a controller of the AUV communicatively coupled to a generator within a water-tight enclosure, if the enclosure will submerge, wherein the generator includes a combustion air intake port and a combustion exhaust port;

stopping, by the controller, the generator responsive to determining that the enclosure will submerge;

closing, by the controller responsive to stopping the generator, an intake valve coupling the air intake port to an outside surface of the enclosure, wherein the intake valve is configured to transport air from the outside surface of the enclosure to the air intake port when the intake valve is open;

closing, by the controller responsive to stopping the generator, an exhaust valve coupling the exhaust port to the outside surface of the enclosure, wherein the exhaust valve is configured to transport exhaust from the exhaust port to the outside surface of the enclosure when the exhaust valve is open;

determining, by the controller, if the enclosure has surfaced;

opening, by the controller, the intake valve responsive to determining that the enclosure has surfaced;

opening, by the controller, the exhaust valve responsive to determining that the enclosure has surfaced; and starting, by the controller, the generator responsive to opening the intake valve and the exhaust valve.

* * * * *